(No Model.)
2 Sheets—Sheet 1.
J. HENDERSON.
PROCESS OF PURIFYING IRON BY MEANS OF FLUORIDES AND CONDENSING THE GASEOUS PRODUCTS THEREFROM.
No. 279,947. Patented June 26, 1883.
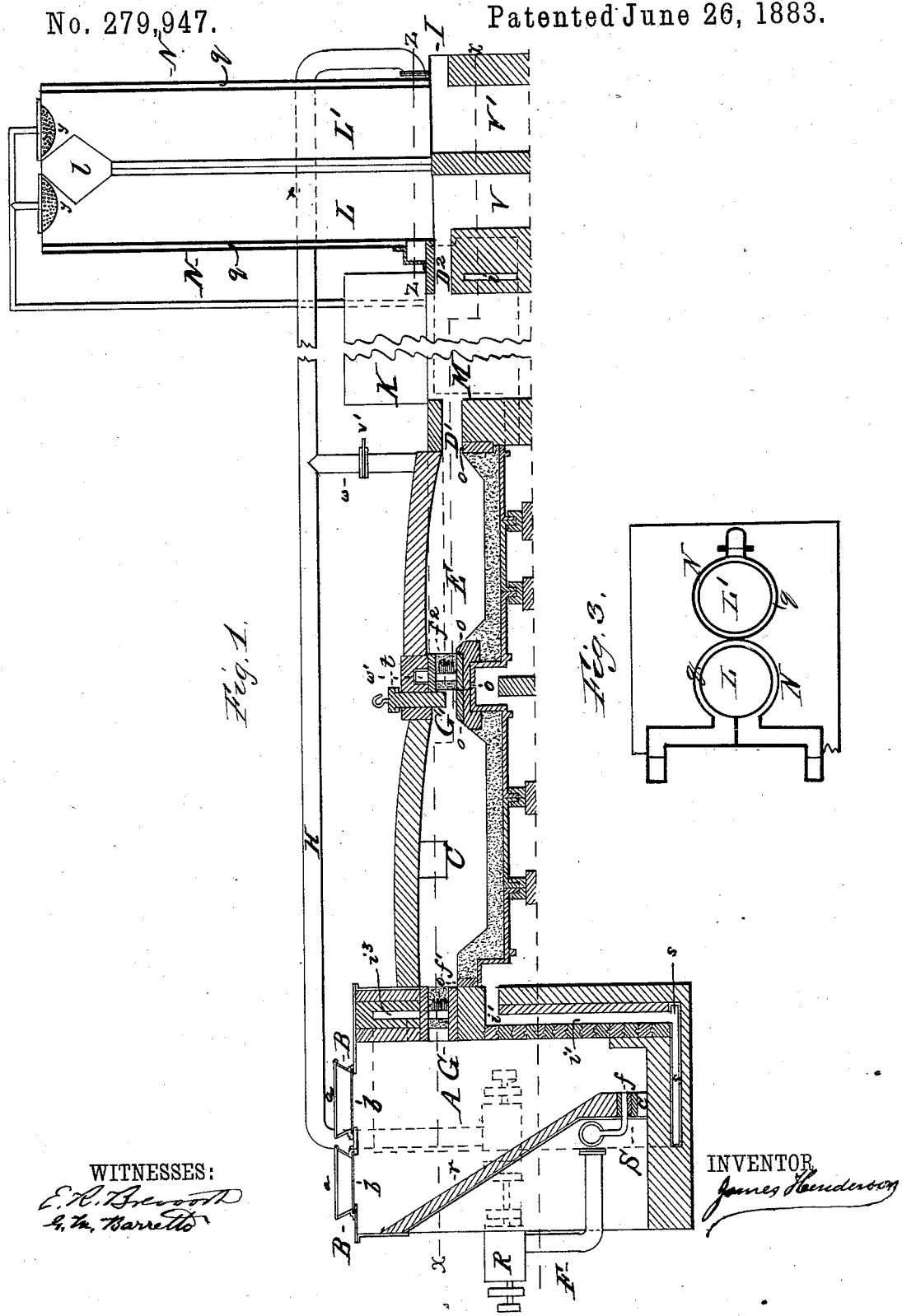
WITNESSES:
INVENTOR
James Henderson (No Model.) 2 Sheets—Sheet 2.
J. HENDERSON.
PROCESS OF PURIFYING IRON BY MEANS OF FLUORIDES AND
CONDENSING THE GASEOUS PRODUCTS THEREFROM.
No. 279,947. Patented June 26, 1883.
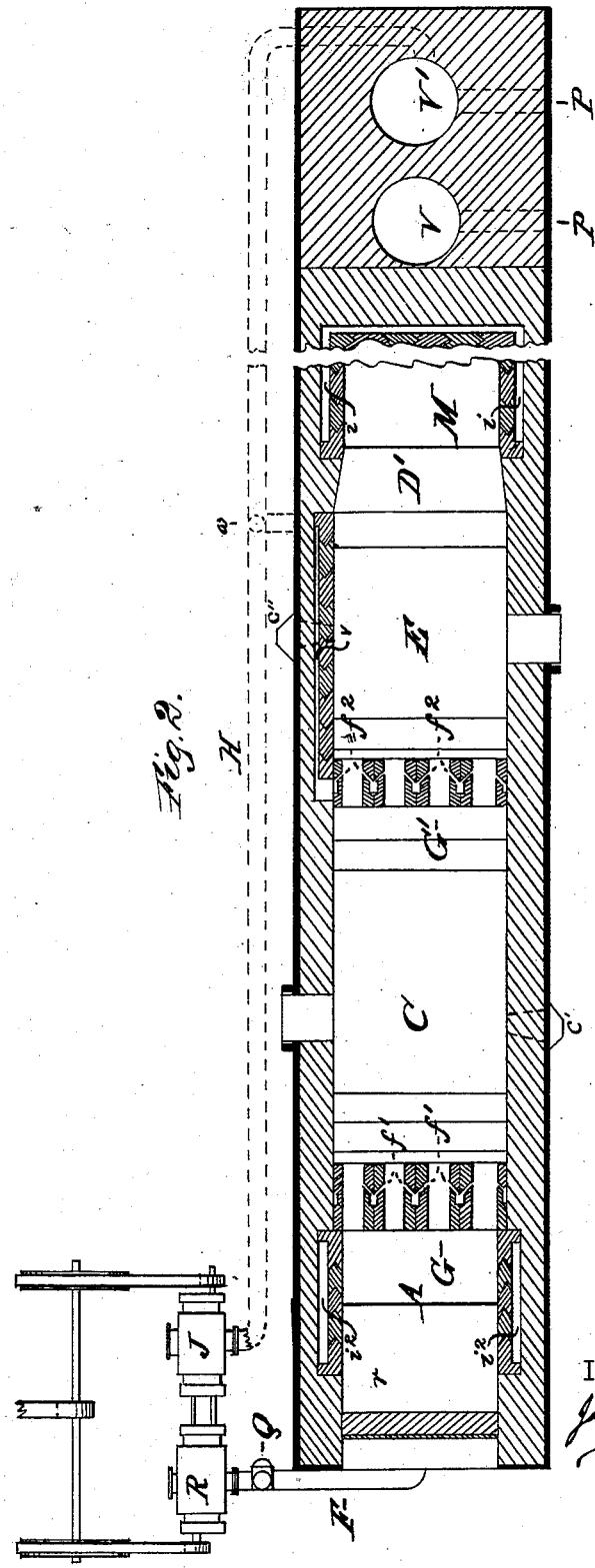
WITNESSES: INVENTOR

UNITED STATES PATENT OFFICE.

JAMES HENDERSON, OF NEW YORK, N. Y., ASSIGNOR, BY MESNE ASSIGNMENTS, TO CHARLES G. FRANCKLYN, OF SAME PLACE.

PROCESS OF PURIFYING IRON BY MEANS OF FLUORIDES AND CONDENSING THE GASEOUS PRODUCTS THEREFROM.

SPECIFICATION forming part of Letters Patent No. 279,947, dated June 26, 1883.

Application filed May 5, 1881. (No model.)

*To all whom it may concern:*

Be it known that I, JAMES HENDERSON, of the city of New York, N. Y., have invented a certain new and useful Improvement in Processes for Purifying Iron by Means of Fluorides and Condensing the Gaseous Products therefrom, of which the following is a full and clear description and specification.

The object of this invention is to make iron and steel more economically, using fluoride of calcium as a reagent and condensing the products of the reaction and collecting them.

The accompanying drawings represent an apparatus by means of which my improvement may be carried out.

Figure 1 is a vertical section (longitudinal) of a gas-producer, reverberatory furnace, boiler, and condensers. Fig. 2 is a horizontal section at $x\ x$ of Fig. 1. Fig. 3 is a horizontal section at $z\ z$ of Fig. 1.

The gas-producer A has a contracted space opposite the tuyeres, so as to concentrate the gases and produce an intense heat, that the slag may be melted. The fuel is charged through the hoppers, having the covers $a\ a$ and doors $b\ b$, and the air for the production of gas from the fuel is supplied by the tuyeres $f f$. From the gas-producer A the gas passes by the flue G into a heating-chamber, C, or reverberatory furnace, on the hearth of which the reagents and iron to be treated are placed. Beyond the chamber C is a second heating-chamber, E, having a connecting-flue, G', through which the gases pass from the chamber C. At the flues G and G' a supply of air is fed to the gases to cause them to burn in the chambers. A partial combustion takes place in the first chamber, which is completed in the second. The air is supplied by pipes from blowers or air-forcing cylinders in fixed proportions to that supplied to the gas-producer A, so that the combustion of the gas may be regulated with accuracy. From the second heating-chamber the gases pass to the chamber M, through the connecting-flue D', in which chamber M is the boiler K, in which boiler steam is generated for driving the engines for the blowers. From the boiler-chamber the gases pass by the flue $D^2$ at the lower end of a condensing-cylinder and through the connecting-passage and out through the escape-flue I into the atmosphere. Through the rose-nozzles $y\ y$, one at the top of each condensing-cylinder, is supplied a continuous spray of water to act upon the gases as they pass through for the purpose of condensing the fluoride of silicon.

The operation of the furnaces and condensers is as follows: The reagents used are fluorides and oxides, preferably fluor-spar and oxide of iron; but any other fluorides and oxides, or oxidizing agents in which the oxide will act upon the base of the fluoride in contact with molten iron to decompose the fluoride, will answer. They are ground to a fine powder, and are mixed in suitable proportions and charged upon the hearth of the reverberatory furnace C, and cast-iron, which has been previously melted in another place, (preferably in the chamber E,) is poured upon them, whereupon, during the succeeding fifteen minutes, or thereabout, chemical action takes place between the silicon in the iron and the fluorine of the fluoride, and fluoride of silicon is formed. Where phosphorus is present, it forms with the fluorine a fluoride of phosphorus, which passes off with the waste products of the operation. The fluorides and oxides may be charged into the chamber E, and cast-iron from a cupola or blast-furnace may be poured upon them, when the same reactions as above described will take place. After the silicon and phosphorus are removed by the chemical reactions, the purified iron may be tapped out through the tap-hole $c$ and poured into the chamber C, and may then be decarbonized to steel or wrought-iron by the action of ore and scrap-iron, as in the open-hearth process, after which the metal may be tapped out through the tap-hole $c''$. The spent gases pass under the steam-boiler K, in order that as large a portion as possible of the temperature may be absorbed before they reach the condensers L L', where they are condensed by the water sprayed upon them from the nozzles $y\ y$, placed at the top of the condensers. The fluoride of silicon thereby becomes converted into silico-fluoric acid, and is recovered from the bottom of the condenser. The water, being in a fine spray, comes in contact with the gases and takes up the fluorides, making the liquid acid. As hydrofluoric acid is also formed, which volatilizes at 60° Fahrenheit, the water should be cooled below this temperature in order to take it up.

The tanks V V', which receive the acids above named, should by preference be lined with lead to resist the action of the hydrofluoric acid.

Either air or water may be forced to circulate in the space $q$ between the inner and outer walls of the condenser, but there is no contact between the water in this space and the gases inside the condenser.

The waste gaseous products of combustion pass away to the chimney through the flue I. The condensers should be arranged in pairs, as shown, and should be of convenient height— say from fifty to seventy feet—and of larger sectional area than the chimney. The gas-passages should be from two hundred to two hundred and eighty feet in length, depending upon the temperature of the gases, their volume, and the temperature of the water used in the condenser. The condensed products are removed from the tanks V V' through the openings P P. Shown in dotted lines.

The drawings show two heating-chambers; but the condensers may be used with one only, or with other than reverberatory furnaces, wherein the fluoride is used as a reagent.

I am aware that condensers of various forms have been heretofore described for condensing gases, and that they have been heretofore used in the manufacture of fluosilicic acid as a single product for condensing fluoride of silicon derived from silica and fluor-spar charged with the fuel into a furnace.

I do not claim the single process of condensing the fluorides of silicon; nor do I wish to be understood as limiting myself to the particular form of condenser shown in the drawings, nor its application to the particular form of furnace shown.

What I claim as new, and desire to secure by Letters Patent, is—

The process of refining iron and steel by the action of fluorides and recovering the condensable gaseous products thereof, consisting in subjecting the impure molten metal to the combined action of a fluoride and an oxidizing agent and condensing the gaseous products by mingling them with water, substantially as specified and set forth.

JAMES HENDERSON.

Witnesses:
CHAS. N. GRAVES,
W. L. BENNEM.